(12) United States Patent
Morota et al.

(10) Patent No.: US 7,778,660 B2
(45) Date of Patent: Aug. 17, 2010

(54) MOBILE COMMUNICATIONS TERMINAL, INFORMATION TRANSMITTING SYSTEM AND INFORMATION RECEIVING METHOD

(75) Inventors: Satoru Morota, Yokohama (JP); Yasutaka Urakawa, Yokohama (JP); Tatsuya Kato, Yokohama (JP); Kenji Ishii, Yokohama (JP); Masanori Fujita, Yokohama (JP)

(73) Assignee: NTT DoCoMo, Inc., Tokyo (JP)

(*) Notice: Subject to any disclaimer, the term of this patent is extended or adjusted under 35 U.S.C. 154(b) by 731 days.

(21) Appl. No.: 10/346,118

(22) Filed: Jan. 17, 2003

(65) Prior Publication Data
US 2003/0162559 A1 Aug. 28, 2003

(30) Foreign Application Priority Data
Jan. 17, 2002 (JP) ............................. 2002-009048

(51) Int. Cl.
*H04M 3/42* (2006.01)
(52) U.S. Cl. .................................. 455/550.1; 455/419
(58) Field of Classification Search ................ 455/557, 455/554, 419; 705/39, 36; 709/220, 200
See application file for complete search history.

(56) References Cited
U.S. PATENT DOCUMENTS

| 5,960,170 | A | | 9/1999 | Chen et al. | |
|---|---|---|---|---|---|
| 6,349,204 | B1 | * | 2/2002 | Goetz et al. | 455/419 |
| 6,574,208 | B1 | | 6/2003 | Matturi et al. | |
| 6,993,328 | B1 | * | 1/2006 | Oommen | 455/419 |
| 2001/0051916 | A1 | * | 12/2001 | Shiomi et al. | 705/39 |
| 2002/0073229 | A1 | * | 6/2002 | Hayashi | 709/237 |
| 2002/0165811 | A1 | * | 11/2002 | Ishii et al. | 705/36 |
| 2003/0157963 | A1 | * | 8/2003 | Collot | 455/557 |
| 2003/0236867 | A1 | * | 12/2003 | Natsuno et al. | 709/220 |
| 2004/0139204 | A1 | * | 7/2004 | Ergezinger et al. | 709/229 |
| 2005/0027792 | A1 | * | 2/2005 | Iwase et al. | 709/200 |
| 2006/0030378 | A1 | * | 2/2006 | Jarvi et al. | 455/575.1 |

FOREIGN PATENT DOCUMENTS
JP 10-078946 A 3/1998

(Continued)

OTHER PUBLICATIONS
Internet Citation, pp. 1-2, XP-002220984, "F-Secure Announces World's First Anti-Virus Product for Wireless Information Devices", Aug. 15, 2000.

*Primary Examiner*—Lester Kincaid
*Assistant Examiner*—Phuoc Doan
(74) *Attorney, Agent, or Firm*—Oblon, Spivak, McClelland, Maier & Neustadt, L.L.P.

(57) ABSTRACT

The present invention provides a portable telephone which allows the efficient storage of data. The portable telephone 100 comprises a pattern data receiving unit 103, a pattern data extraction unit 104, and a pattern data storage unit 105. The pattern data receiving unit 103 receives a plurality of sets of pattern data that are transmitted from a server device 10 in accordance with a pattern data transmission request. The pattern data extraction unit 104 extracts specified pattern data from the plurality of sets of pattern data received by the pattern data receiving unit 103 on the basis of terminal information that relates to the portable telephone 100. The pattern data storage unit 105 stores the specified pattern data that is extracted by the pattern data extraction unit 104.

25 Claims, 15 Drawing Sheets

FOREIGN PATENT DOCUMENTS

| | | |
|---|---|---|
| JP | 2000-286957 | 10/2000 |
| JP | 2001-078258 | 3/2001 |
| JP | 2001-515625 | 9/2001 |
| JP | 2001-339501 | 12/2001 |
| JP | 2002-512767 | 4/2002 |
| JP | 2004-501546 | 1/2004 |
| WO | WO 99/56486 A1 | 11/1999 |
| WO | WO 01/33889 | 5/2001 |

* cited by examiner

Fig.4

| PATTERN DATA | MODEL |
|---|---|
| PATTERN DATA1 | MODEL1 |
| PATTERN DATA2 | MODEL2 |
| PATTERN DATA3 | MODEL1 |
| PATTERN DATA4 | MODEL2 |
| PATTERN DATA5 | MODEL1 |
| PATTERN DATA6 | MODEL2 |
| PATTERN DATA7 | MODEL1 |

| PATTERN DATA | DEGREE OF DANGER | SIZE |
|---|---|---|
| PATTERN DATA1 | A | 15kB |
| PATTERN DATA2 | B | 10kB |
| PATTERN DATA3 | C | 20kB |
| PATTERN DATA4 | C | 10kB |
| PATTERN DATA5 | B | 20kB |
| PATTERN DATA6 | A | 20kB |
| PATTERN DATA7 | B | 20kB |

| PATTERN DATA | MODEL | OS | DEGREE OF DANGER | SIZE | DATE OF UPDATING |
|---|---|---|---|---|---|
| PATTERN DATA 1 | MODEL 1 | OS1, Ver1. 05 | A | 15kB | 2001. 11. 2 |
| PATTERN DATA 2 | MODEL 2 | OS1, Ver1. 05 | B | 10kB | 2001. 11. 5 |
| PATTERN DATA 3 | MODEL 1 | OS1, Ver1. 05 | C | 20kB | 2001. 11. 7 |
| PATTERN DATA 4 | MODEL 2 | OS1, Ver1. 05 | C | 10kB | 2001. 11. 8 |
| PATTERN DATA 5 | MODEL 1 | OS1, Ver1. 00 | B | 20kB | 2001. 11. 9 |
| PATTERN DATA 6 | MODEL 2 | OS1, Ver1. 00 | A | 20kB | 2001. 11. 9 |
| PATTERN DATA 7 | MODEL 1 | OS1, Ver1. 05 | B | 20kB | 2001. 11. 9 |

| TELEPHONE NUMBER | MODEL | OS |
|---|---|---|
| 090-0000-0000 | MODEL1 | OS1, Ver1. 05 |

| PATTERN DATA | APPLICATION PROGRAM |
|---|---|
| PATTERN DATA1 | APPLICATION PROGRAM1 |
| PATTERN DATA2 | APPLICATION PROGRAM3 |
| PATTERN DATA3 | APPLICATION PROGRAM1 |
| PATTERN DATA4 | APPLICATION PROGRAM3 |
| PATTERN DATA5 | APPLICATION PROGRAM1 |
| PATTERN DATA6 | APPLICATION PROGRAM2 |
| PATTERN DATA7 | APPLICATION PROGRAM3 |

| TELEPHONE NUMBER | APPLICATION PROGRAM |
|---|---|
| 090-0000-0000 | APPLICATION PROGRAM 1 |
| | APPLICATION PROGRAM 2 |

MOBILE COMMUNICATIONS TERMINAL, INFORMATION TRANSMITTING SYSTEM AND INFORMATION RECEIVING METHOD

BACKGROUND OF THE INVENTION

1. Field of the Invention

The present invention relates to a mobile communications terminal, an information transmitting system and an information receiving method.

2. Description of the Related Art

The current development of mobile communications technology has been remarkable, and our daily life activities are made increasingly convenient in the current age of the "information society". For example, as a result of the spread of the internet, useful application programs and data files can easily be received by terminal devices such as personal computers or the like, and can be utilized.

However, in cases where the abovementioned conventional technology is used for the acquisition of data in mobile communications terminals such as portable telephones, the following problems have been encountered. Specifically, compared to terminal devices such as personal computers or the like, mobile communications terminals have an insufficient memory capacity, so that it is difficult to store all of the received data in such mobile communications terminals.

SUMMARY OF THE INVENTION

Accordingly, it is an object of the present invention to provide a mobile communications terminal, an information transmitting system and an information receiving method which solve the abovementioned problems, and which allow the efficient storage of data in mobile communications terminals.

In order to solve the abovementioned problems, the mobile communications terminal of the present invention comprises receiving means for receiving a plurality of sets of data that are transmitted from a server device, extraction means for extracting specified data from the abovementioned plurality of sets of data received by the abovementioned receiving means on the basis of terminal information relating to the abovementioned mobile communications terminal, and storing means for storing the abovementioned specified data extracted by the abovementioned extraction means.

Furthermore, in order to solve the abovementioned problems, the information transmitting system of the present invention comprises the abovementioned mobile communications terminal, and a server device which transmits the abovementioned data to this mobile communications terminal.

Furthermore, in order to solve the abovementioned problems, the information receiving method of the present invention is an information receiving method in which a mobile communications terminal receives data from a server device, comprising a receiving step in which the abovementioned mobile communications terminal receives a plurality of sets of data from the server device, an extraction step in which the abovementioned mobile communications terminal extracts specified data on the basis of terminal information relating to the abovementioned mobile communications terminal from the abovementioned plurality of sets of data received in the abovementioned receiving step, and a storage step in which the abovementioned specified data extracted in the abovementioned extraction step is stored in storing means.

In these inventions, the mobile communications terminal extracts specified data from the plurality of sets of received data on the basis of terminal information that relates to the mobile communications terminal. Accordingly, data that has a high degree of association with the mobile communications terminal can be extracted. In this way, data can easily be stored even in a mobile communications terminal that has an insufficient memory capacity. As a result, the storage of data in the mobile communications terminal can be accomplished in an efficient manner.

Furthermore, in the mobile communications terminal of the present invention, it is desirable that the abovementioned data be pattern data that is used for the detection of computer viruses.

Furthermore, in the information receiving method of the present invention, it is desirable that the abovementioned data be pattern data that is used for the detection of computer viruses.

Computer viruses include many computer viruses that depend on the conditions of the mobile communications terminal such as the hardware and software of the mobile communications terminal, the data (including application programs and data files) that has been received by the mobile communications terminal and the like. Furthermore, the quantity of data that can be stored varies according to the conditions of the mobile communications terminal such as the hardware and software of the mobile communications terminal or the like. Accordingly, specified pattern data is extracted on the basis of terminal information such as the hardware and software of the mobile communications terminal, application programs stored in the mobile communications terminal and the like, and the specified pattern data that has thus been extracted is stored in the mobile communications terminal. As a result, the amount of pattern data that is stored in the mobile communications terminal can be efficiently reduced in accordance with the conditions of this mobile communications terminal.

Furthermore, in the mobile communications terminal of the present invention, it is desirable that the abovementioned terminal information be information that relates to the hardware of the abovementioned mobile communications terminal.

Furthermore, in the information receiving method of the present invention, it is desirable that the abovementioned terminal information be information that relates to the hardware of the abovementioned mobile communications terminal.

Computer viruses include many computer viruses that depend on the hardware of the mobile communications terminal; furthermore, the quantity of pattern data that can be stored varies according to the hardware of the mobile communications terminal. Accordingly, specified pattern data is extracted on the basis of information that relates to the hardware of the mobile communications terminal, and the specified pattern data that has thus been extracted is stored in the mobile communications terminal. As a result, the quantity of pattern data that is stored in the mobile communications terminal can be efficiently reduced in accordance with the hardware of the mobile communications terminal.

Furthermore, in the mobile communications terminal of the present invention, it is desirable that the abovementioned terminal information be information that relates to the memory capacity of the abovementioned mobile communications terminal.

Furthermore, in the information receiving method of the present invention, it is desirable that the abovementioned terminal information be information that relates to the memory capacity of the abovementioned mobile communications terminal.

The quantity of pattern data that can be stored in the mobile communications terminal depends on the memory capacity of the mobile communications terminal. Accordingly, specified pattern data is extracted on the basis of terminal information that relates to the memory capacity of the mobile communications terminal, and the specified pattern data that has thus been extracted is stored in the storing means of the mobile communications terminal. As a result, the quantity of pattern data that is stored in the mobile communications terminal can be efficiently reduced in accordance with the memory capacity of the mobile communications terminal.

Furthermore, in the mobile communications terminal of the present invention, it is desirable that the abovementioned terminal information be information that relates to the software of the abovementioned mobile communications terminal.

Furthermore, in the information receiving method of the present invention, it is desirable that the abovementioned terminal information be information that relates to the software of the abovementioned mobile communications terminal.

Computer viruses include many computer viruses that depend on the software of the mobile communications terminal. Furthermore, the quantity of pattern data that can be stored varies according to the software of the mobile communications terminal. Accordingly, specified pattern data is extracted on the basis of information that relates to the software of the mobile communications terminal, and the specified pattern data that has thus been extracted is stored in the storing means of the mobile communications terminal. As a result, the quantity of pattern data that can be stored in the mobile communications terminal can be efficiently reduced in accordance with the software of the mobile communications terminal.

Furthermore, in the mobile communications terminal of the present invention, it is desirable that the abovementioned terminal information be information that relates to the operating system of the abovementioned mobile communications terminal.

Furthermore, in the information receiving method of the present invention, it is desirable that the abovementioned terminal information be information that relates to the operating system of the abovementioned mobile communications terminal.

Computer viruses include many computer viruses that depend on the operating system of the mobile communications terminal. Furthermore, the quantity of pattern data that can be stored varies according to the operating system of the mobile communications terminal. Accordingly, specified pattern data is extracted on the basis of information that relates to the operating system of the mobile communications terminal, and the specified data that has thus been extracted is stored in the storing means of the mobile communications terminal. As a result, the quantity of pattern data that can be stored in the mobile communications terminal can be efficiently reduced in accordance with the operating system of the mobile communications terminal.

Furthermore, in the mobile communications terminal of the present invention, it is desirable that the abovementioned terminal information be information that relates to application programs that are stored in the abovementioned mobile communications terminal.

Furthermore, in the information receiving method of the present invention, it is desirable that the abovementioned terminal information be information that relates to application programs that are stored in the abovementioned mobile communications terminal.

Computer viruses include many computer viruses that depend on the application programs that are stored in the mobile communications terminal. Accordingly, specified pattern data is extracted on the basis of the application programs that are stored in the mobile communications terminal, and the specified data that has thus been extracted is stored in the storing means of the mobile communications terminal. As a result, the quantity of pattern data that can be stored in the mobile communications terminal can be efficiently reduced in accordance with the application programs that are stored in the mobile communications terminal.

Furthermore, in the mobile communications terminal of the present invention, it is desirable that the abovementioned extraction means extract data that is selected by the user of the abovementioned mobile communications terminal from the abovementioned specified data.

Furthermore, in the information receiving method of the present invention, it is desirable that the abovementioned mobile communications terminal extract data that is selected by the user of the abovementioned mobile communications terminal from the abovementioned specified data in the abovementioned extraction step.

In these inventions, as a result of data selected by the user of the mobile communications terminal being further extracted from the specified data, it is possible for the user of the mobile communications terminal to store desired data. As a result, the quantity of data that is stored in the mobile communications terminal can be further reduced.

BRIEF DESCRIPTION OF THE DRAWINGS

FIG. 4 is a structural diagram of the pattern data data base;

FIG. 6 is a structural diagram of the pattern data data base;

FIG. 9 is a structural diagram of the pattern data data base;

FIG. 10 is a structural diagram of the terminal information storage unit;

FIG. 13 is a structural diagram of the pattern data data base;

FIG. 14 is a structural diagram of the terminal information storage unit; and

DESCRIPTION OF THE PREFERRED EMBODIMENTS

First Embodiment

An information transmitting system constituting a first embodiment of the present invention will be described. Furthermore, the information transmitting system of the present embodiment includes a mobile communications terminal that constitutes an embodiment of the present invention.

Figure 1:
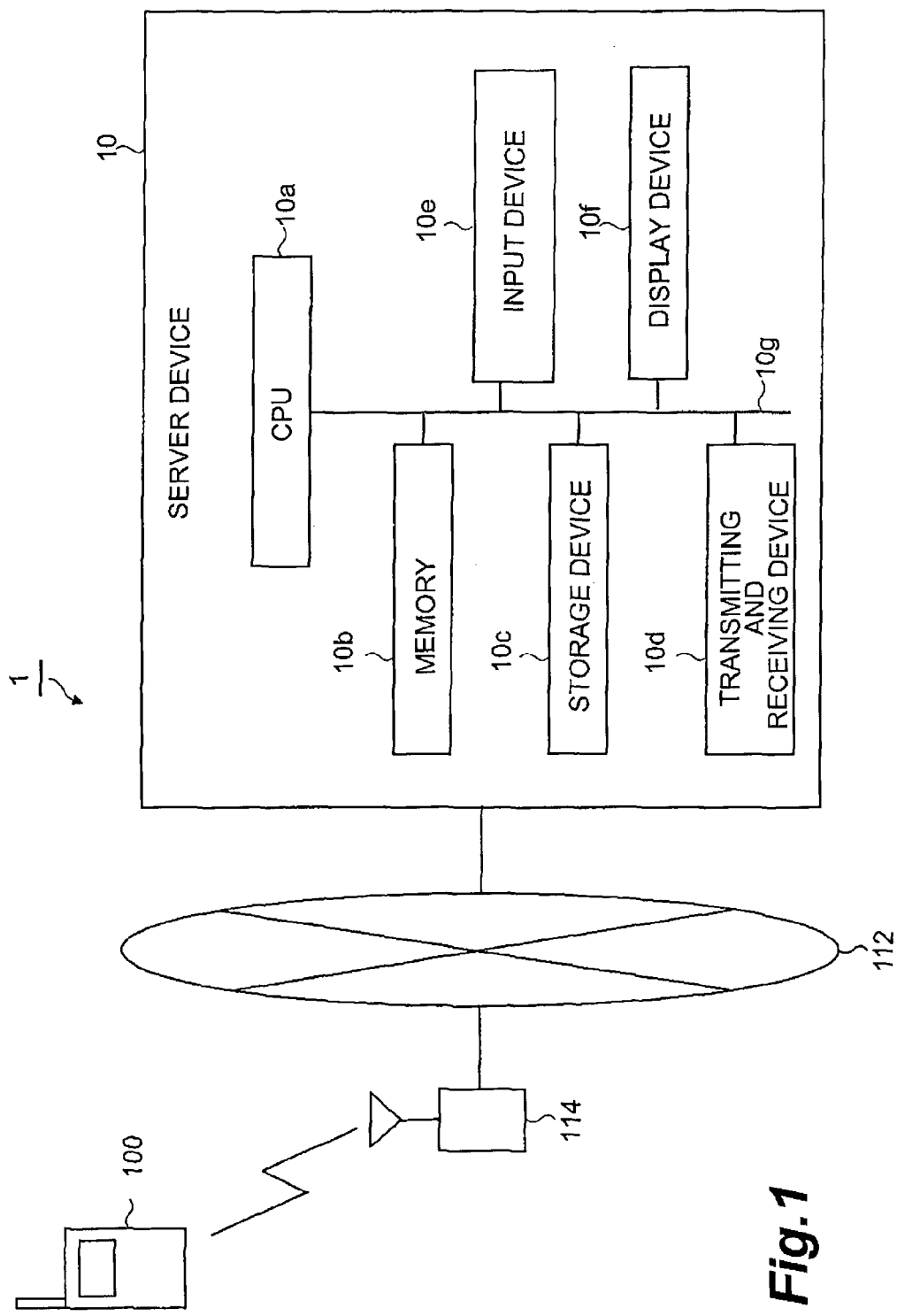
FIG. 1 is a hardware structural diagram of the information transmitting system of the first embodiment.

First, the construction of the information transmitting system of the present embodiment will be described. FIG. 1 is a hardware structural diagram of the of the information transmitting system of the present embodiment. The information transmitting system 1 of the present embodiment comprises a server device 10 and a portable telephone 100 (mobile communications terminal). The server device 10 is connected to the portable telephone 100 via a mobile communications network 112 and a base station 114, so that the mutual communication of data is possible.

The server device 10 comprises a CPU 10a, a memory 10b, a storage device 10c such as a magnetic disk, optical disk or the like, a transmitting and receiving device 10d which transmits and receives data between [the server device 10] and the portable telephone 100, an input device 10e such as a keyboard, mouse or the like, and a display device 10f such as a display or the like. Here, the CPU 10a, memory 10b, storage device 10c, transmitting and receiving device 10d, input device 10e and display device 10f are respectively connected by a bus 10g, so that the mutual transmission and reception of data are possible.

Figure 2:
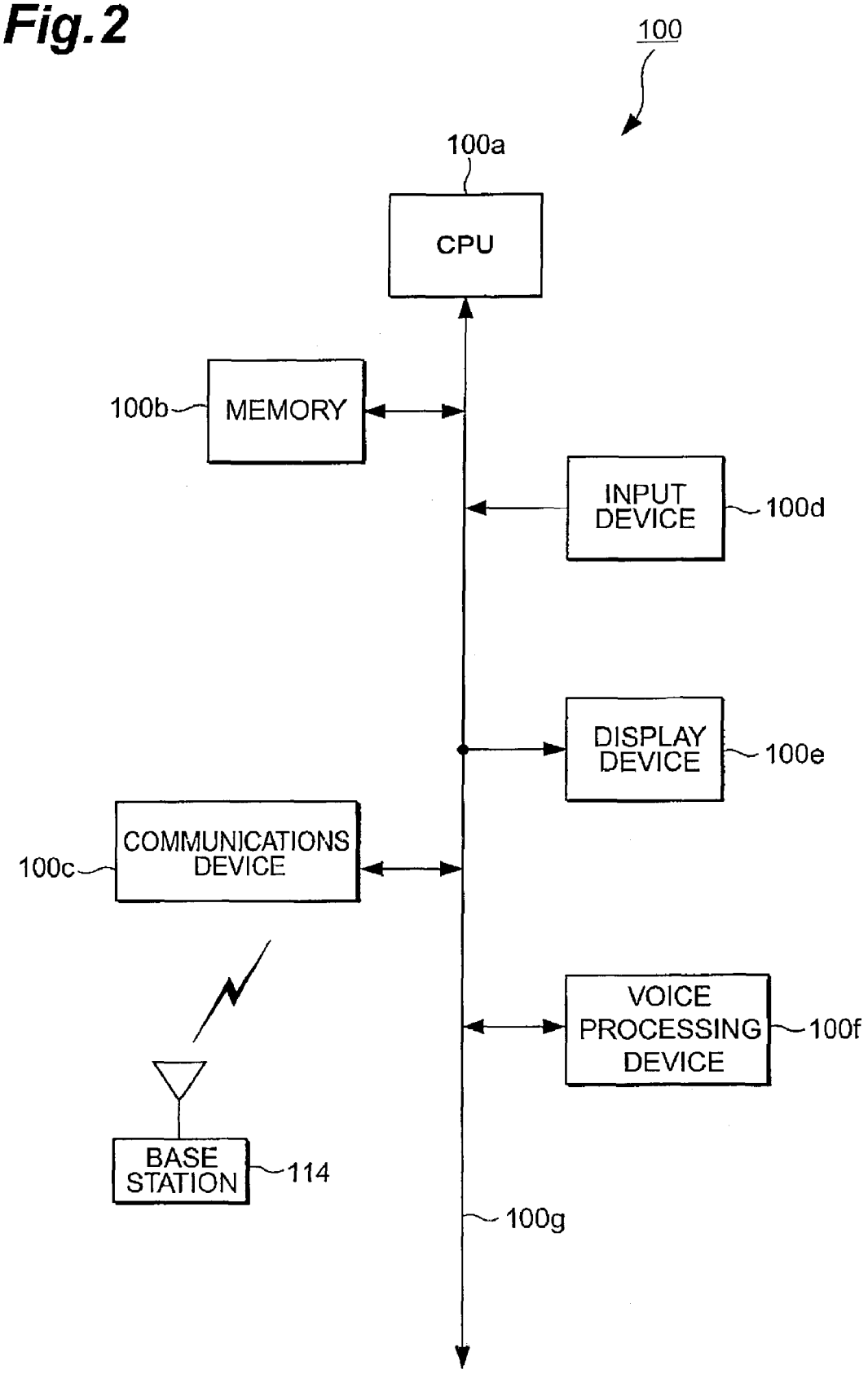
FIG. 2 is a hardware structural diagram of the portable telephone of the first embodiment.

FIG. 2 is a hardware structural diagram of the portable telephone 100. The portable telephone 100 comprises a CPU 100a, a memory 100b such as a semiconductor memory or the like, a communications device 100c which transmits and receives data between [the portable telephone 100] and the server device 10, an input device 100d consisting of operating buttons or the like, a display device 100e such as an LCD (liquid crystal display), EL (electro-luminescence) [display] or the like, and a voice processing device 100f consisting of a microphone, speaker and the like. Here, the CPU 100a, memory 100b, communications device 100c, input device 100d, display device 100e and voice processing device 100f are respectively connected by a bus 100g, so that the mutual transmission and reception of data are possible.

Figure 3:
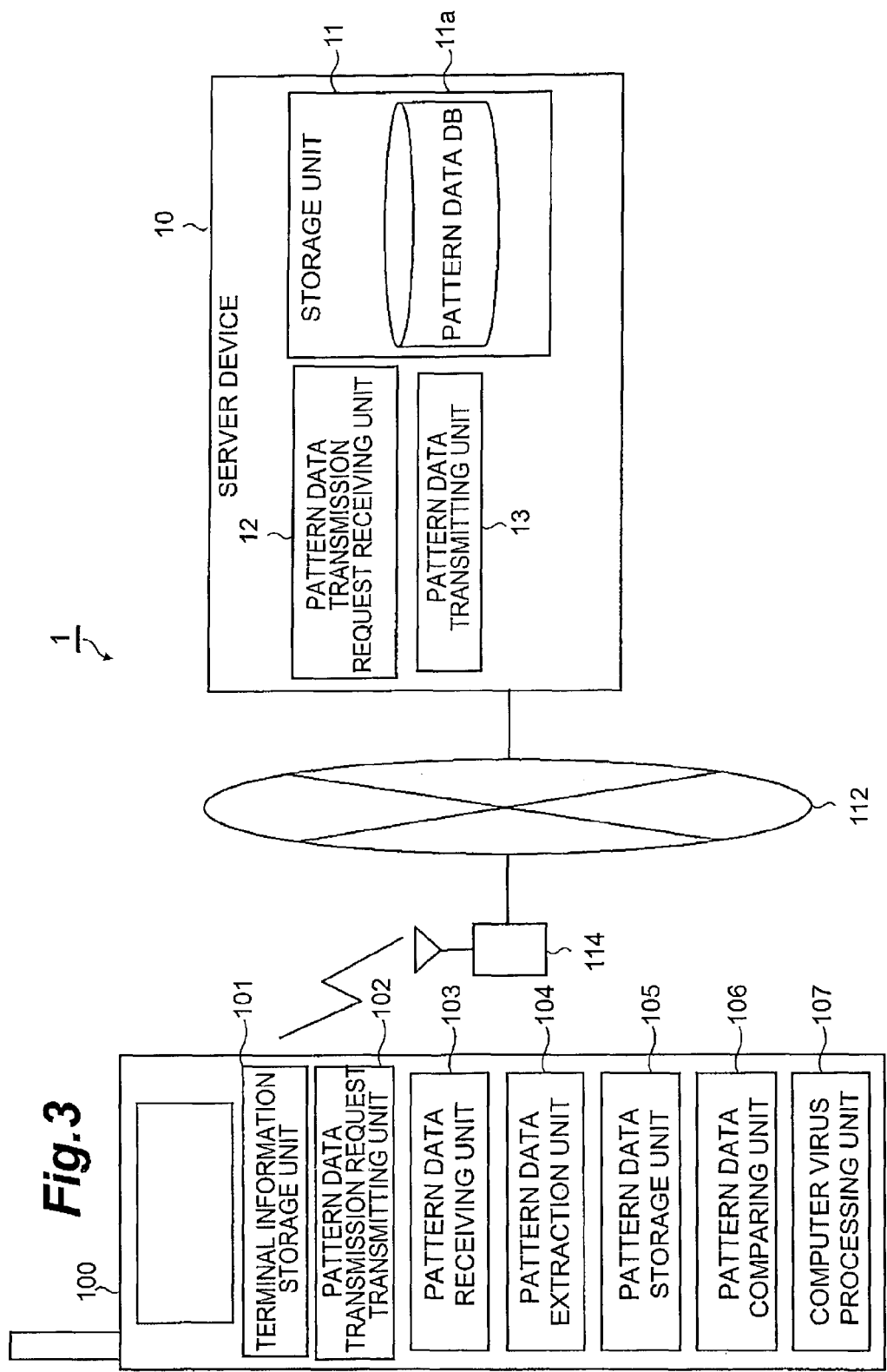
FIG. 3 is system structural diagram of the information transmitting system of the first embodiment.

FIG. 3 is a system structural diagram of the information transmitting system 1. The server device 10 of the information transmitting system 1 is a server device which transmits pattern data used for the detection of computer viruses to the portable telephone 100; in functional terms, this server device 10 comprises a storage unit 11, a pattern data transmission request receiving unit 12, and a pattern data transmitting unit 13. The respective constituent elements will be described in detail below.

A pattern data data base 11a is stored in the storage unit 11. FIG. 4 is a structural diagram of the pattern data data base. Pattern data consisting of characteristic data sequences contained in computer viruses (this may also be converted into files and referred to as "pattern files" in some cases), and model names of portable telephones 100, are stored in the pattern data data base 11a. Furthermore, for convenience of description, a system is described in which the pattern data itself is stored in the pattern data data base 11a; however, it would also be possible to store pointers that indicate the storage locations of pattern data in the pattern data data base 11a, and to store the pattern data itself in the storage locations indicated by these pointers.

Returning to FIG. 3, the pattern data transmission request receiving unit 12 receives pattern data transmission requests that are transmitted from the portable telephone 100.

The pattern data transmitting unit 13 transmits the pattern data stored in the pattern data data base 11a to the portable telephone 100 along with model names.

The portable telephone 100 is a mobile communications terminal which receives pattern data used for the detection of computer viruses that is transmitted from the server device; in functional terms, this portable telephone 100 comprises a terminal information storage unit 101, a pattern data transmission request transmitting unit 102, a pattern data receiving unit 103 (receiving means), a pattern data extraction unit 104 (extraction means), a pattern data storage unit 105 (storing means), a pattern data comparing unit 106, and a computer virus processing unit 107. Here, the terminal information storage unit 101 and pattern data storage unit 105 correspond to the memory 100b shown in FIG. 2. The pattern data transmission request receiving unit 102, pattern data receiving unit 103, pattern data extraction unit 104, pattern data comparing unit 106 and computer virus processing unit 107 are realized as a result of software that is stored in the memory 100b shown in FIG. 2 being executed by the CPU 100a. The respective constituent elements will be described in detail below.

The telephone numbers and model names (terminal information) of portable telephones 100 are stored in the terminal information storage unit 101.

The pattern data transmission request receiving unit 102 transmits pattern data transmission requests to the server device 10.

The pattern data receiving unit 103 receives the pattern data that is transmitted from the pattern data transmitting unit 13 of the server device 10 together with the model names.

The pattern data extraction unit 104 extracts specified pattern data form a plurality of sets of pattern data on the basis of the model name of the portable telephone 100. To describe this in greater detail, the pattern data extraction unit 104 uses the model name of the portable telephone 100 as a key to extract specified pattern data that is to be stored by the portable telephone 100 from the pattern data that is received by the pattern data receiving unit 103.

The pattern data storage unit 105 stores the specified pattern data that has been extracted by the pattern data extraction unit 104. Furthermore, the pattern data storage unit 105 stores only the specified pattern data that has been extracted by the pattern data extraction unit 104, and eliminates other pattern data.

Using the pattern data that has been stored in the pattern data storage unit 105, the pattern data comparing unit 106 detects whether or not a computer virus is contained in the application programs that are present in the portable telephone 100. To describe this in greater detail, the application programs and the pattern data that is stored in the pattern data storage unit 105 are compared, and a judgement is made as to whether or not the application programs contain portions that match the abovementioned pattern data. Here, in cases where the application programs contain portions that match the abovementioned pattern data, the pattern data comparing unit 106 judges that a computer virus is contained in the application programs, while in cases where the application programs do not contain portions that match the abovementioned pattern data, the pattern data comparing unit 106 judges that no computer virus is contained in the abovementioned application programs.

In cases where it is judged by the pattern data comparing unit 106 that a computer virus is contained in a specified application program, the computer virus processing unit 107 performs processing that sends a warning to the user of the portable telephone 100, processing that prohibits the execution of this application program, processing that repairs this application program or the like on the basis of predetermined set information.

Figure 5:
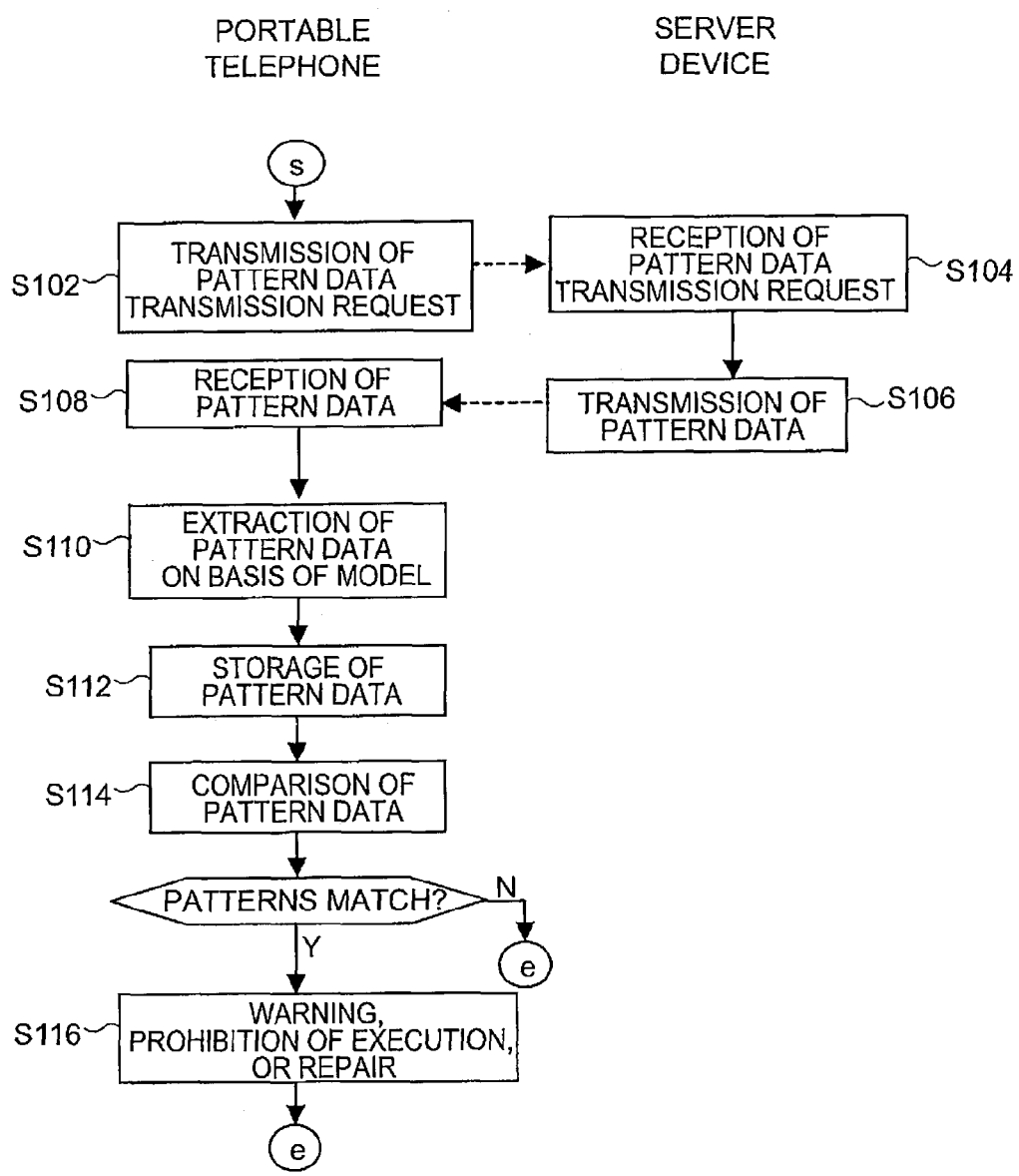
FIG. 5 is s flow chart which shows the flow of the processing of the information transmitting system of the first embodiment.

Next, the operation of the information transmitting system of the present embodiment will be described, and an information receiving method constituting an embodiment of the present invention will also be described. FIG. 5 is a flow chart which shows the operation of the information transmitting system 1 of the present embodiment. In the information transmitting system 1 of the present embodiment, when the portable telephone 100 receives pattern data used for the detection of computer viruses from the server device 10, a pattern data transmission request is first transmitted to the server device 10 from the portable telephone 100 by the pattern data transmission request transmitting unit 102 (S102) The pattern data transmission request transmitted from the portable telephone 100 is received by the pattern data transmission request receiving unit 12 of the server device 10 (S104).

When a pattern data transmission request is received by the pattern data transmission request receiving unit 12 of the server device 10, the pattern data stored in the pattern data data base 11a is transmitted to the portable telephone 100 form the pattern data transmitting unit 13 along with the model name (S106). The transmitted pattern data and model name are received by the pattern data receiving unit 103 of the portable telephone 100 (S108).

Next, specified pattern data is extracted from a plurality of sets of pattern data by the pattern data extraction unit 104 of the portable telephone 100 on the basis of the model name of the portable telephone 100 (S110). To describe this in greater detail, specified pattern data that is to be stored by the portable telephone 100 is extracted from the pattern data received by the pattern data receiving unit 103 using the model name of the portable telephone 100 that is stored in the terminal information storage unit 101 as a key. For example, in a case where the server device 10 has the pattern data data base 11a shown in FIG. 4, and the model name of the portable telephone 100 is "Model 2", "pattern data 2", "pattern data 4" and "pattern data 6" are extracted as the pattern data that is to be stored by the portable telephone 100. The extracted pattern data is temporarily stored in the pattern data storage unit 105 of the portable telephone 100 (S112).

Subsequently, the pattern data stored in the pattern data storage unit 105 of the portable telephone 100 and data (including application programs) stored in the memory of the portable telephone 100 are compared by the pattern data comparing unit 106 (S114), and a judgement is made as to whether or not the data stored in the memory of the portable telephone 100 has portions that match the abovementioned pattern data. Furthermore, the comparison of the pattern data and data stored in the memory of the portable telephone 100 may be initiated at the time that the pattern data is received, or after a fixed period of time has elapsed following the reception of this pattern data. Moreover, this comparison may be initiated by instructions from the user of the portable telephone 100, or may be periodically initiated on the basis of a predetermined period.

In cases where the results of the comparison indicate that the data stored in the memory of the portable telephone 100 detection does not contain portions that match the abovementioned pattern data, it is judged that no computer virus is present in the portable telephone 100, and the processing is ended. On the other hand, in cases where the data stored in the memory of the portable telephone 100 contains portions that match the abovementioned pattern data, it is judged that a computer virus is present in the portable telephone 100, and processing that sends a warning to the user of the portable telephone 100, processing that prohibits the execution of application programs in which a computer virus has been detected, repair processing of the data in which a computer virus has been detected or the like is executed by the computer virus processing unit 107 (S116) Furthermore, the abovementioned warning processing, execution prohibition processing and repair processing are respectively similar to existing warning processing, execution prohibition processing and repair processing performed in cases where computer viruses are detected in personal computers.

Next, the effects and merits of the information transmitting system of the present embodiment will be described. Computer viruses include many computer viruses that are dependent on the hardware and software of the portable telephone. Furthermore, the quantity of pattern data that can be stored varies according to the hardware, software and the like of the portable telephone. In this respect, the information transmitting system i of the present embodiment, when the portable telephone 100 receives pattern data used for the detection of computer viruses from the server device 10, specified pattern data is extracted on the basis of the model name of the portable telephone 100 (information that specifies both the hardware and software), and the specified data that has thus been extracted is stored in the portable telephone 100. Accordingly, the quantity of pattern data that is stored in the portable telephone 100 can be efficiently reduced in accordance with the hardware and software of the portable telephone. As a result, the detection of computer viruses in the portable telephone 100 can be accomplished in an efficient manner.

In the information transmitting system 1 of the abovementioned embodiment, the portable telephone 100 extracts pattern data on the basis of the model name of the portable telephone 100. However, various modifications of this arrangement are conceivable. For example, it would also be possible to devise the system so that the portable telephone 100 extracts pattern data on the basis of the name of the maker of the portable telephone 100. Furthermore, instead of using the model name or name of the maker of the portable telephone 100, it would also be possible to use the memory capacity, operating system name, security level, permissible communication charge or the like of the portable telephone 100. Moreover, in the pattern data data base 11a, the pattern data that is to be transmitted to the portable telephone may also be extracted and arranged beforehand for each model name.

Below, a modification in which the portable telephone 100 extracts pattern data on the basis of the memory capacity of the portable telephone 100 will be described in detail as one example.

In the present modification, the pattern data data base 11b shown in FIG. 6 is used instead of the pattern data data base 11a shown in FIG. 4. Pattern data, the degree of danger of computer viruses that have this pattern data, the size of this pattern data and the like are stored in the pattern data data base 11b in association with each other. Here, the "degree of danger" of a computer virus is an indicator that indicates the virulence of the [deleterious] effect of the computer virus. For example, a degree of danger of "A" indicates that the [deleterious] effect is extremely great, a degree of danger of "B" indicates that the [deleterious] effect is considerable, and a degree of danger of "C" indicates that the [deleterious] effect is small.

Figure 7:
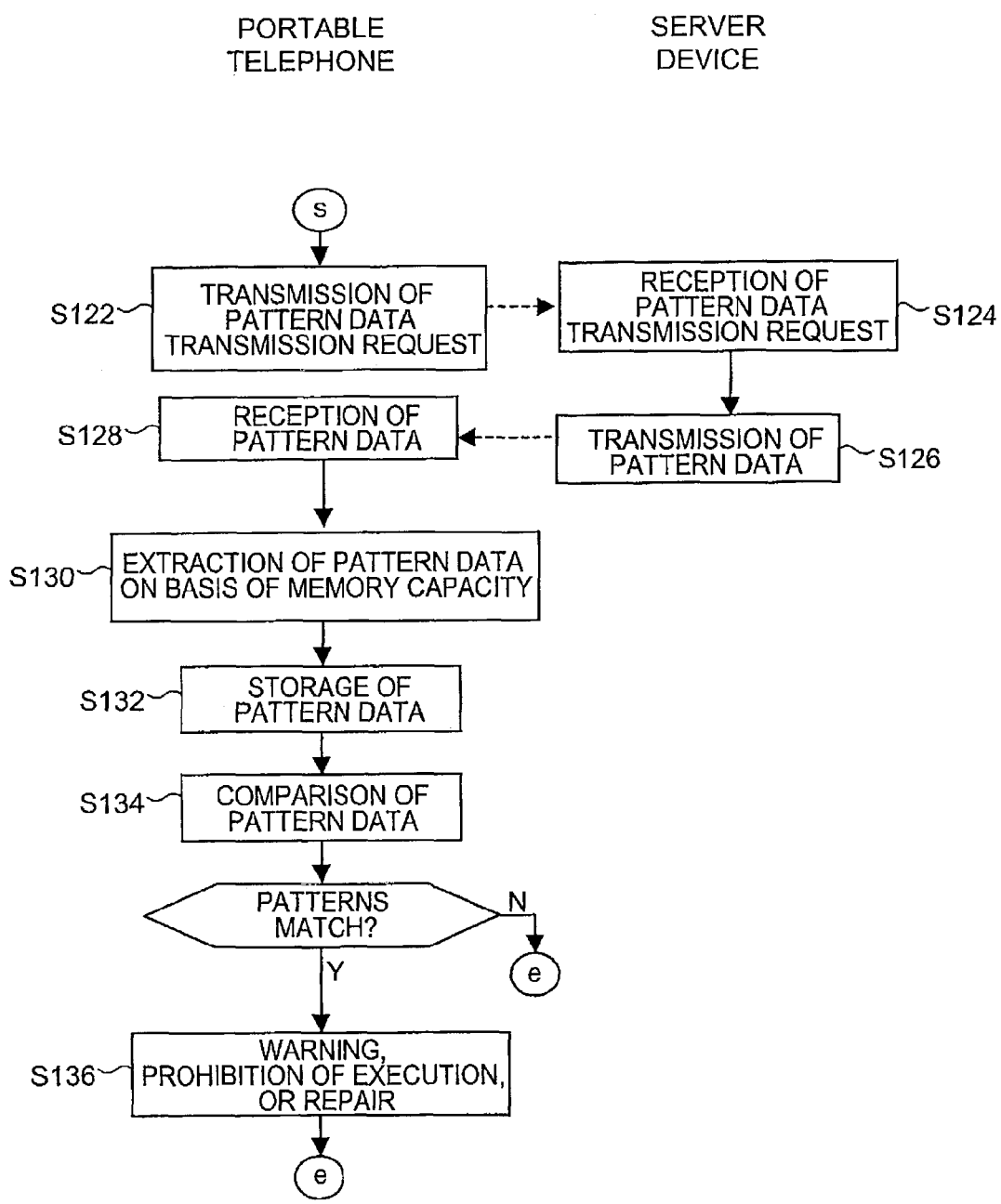
FIG. 7 is a flow chart which shows the flow of the processing of the information transmitting system of the first embodiment.

FIG. 7 is a flow chart which shows the flow of the processing of the information transmitting system of the present modification. In the information transmitting system 1 of the present embodiment, when the portable telephone 100 receives pattern data used for the detection of computer viruses from the server device 10, a pattern data transmission request is first transmitted to the server device 10 from the portable telephone 100 by the pattern data transmission request transmitting unit 102 (S122). Next, the pattern data transmission request that is transmitted from the portable telephone 100 is received by the pattern data transmission request receiving unit 12 of the server device 10 (S124).

When a pattern data transmission request is received by the pattern data transmission request receiving unit 12 of the server device 10, the pattern data stored in the pattern data data base 11*b* is transmitted to the portable telephone 100 from the pattern data transmitting unit 13 together with the size (data volume) and degree of danger (S126). The transmitted pattern data, size and degree of danger are received by the pattern data receiving unit 103 of the portable telephone 100 (S128). Here, the portable telephone 100 that is the transmission destination is specified by the telephone number included in the pattern data transmission request.

Next, specified pattern data is extracted form a plurality of sets of pattern data by the pattern data extraction unit 104 of the portable telephone 100 on the basis of the memory capacity of the portable telephone 100 (S130). To describe this in greater detail, specified pattern data that is to be stored by the portable telephone 100 is selected from the plurality of sets of pattern data received by the portable telephone 100 in order from the highest degree of danger within a range in which the size of the pattern data does not exceed the abovementioned memory capacity. For example, in a case where the memory capacity of the portable telephone 100 is "40 kB", "pattern data 1" (degree of danger A, 15 kB) and "pattern data 6" (degree of danger A, 20 kB) are extracted in the pattern data data base 11*b* shown in FIG. 6. Subsequently, the processing of S132 through S136 is similar to the processing of S112 through S116 described with reference to FIG. 5.

Here, the "memory capacity" may be the capacity of the memory region as a whole, or may be the capacity of the empty region. Alternatively, this may also be the capacity of a region assigned beforehand for the storage of pattern data. Furthermore, the term "memory" used here includes not only the internal memory of the portable telephone 100, but also [external] memories that are connected to the portable telephone 100.

The quantity of pattern data that can be stored in the portable telephone 100 depends on the memory capacity of the portable telephone 100. By extracting pattern data on the basis of the memory capacity of the portable telephone 100 and storing the extracted pattern data in the portable telephone 100 as in the present modification, it is possible to achieve a sufficient reduction in the amount of pattern data that is stored in the portable telephone 100 in accordance with the memory capacity of this portable telephone 100.

Second Embodiment

Next, an information transmitting system constituting a second embodiment of the present invention will be described. Furthermore, the information transmitting system of the present embodiment includes a mobile communications terminal that constitutes an embodiment of the present invention.

First, the construction of the information transmitting system of the present embodiment will be described. The hardware construction of the information transmitting system of the present embodiment is similar to the hardware construction of the information transmitting system of the abovementioned first embodiment that was described with reference to FIGS. 1 and 2.

Figure 8:
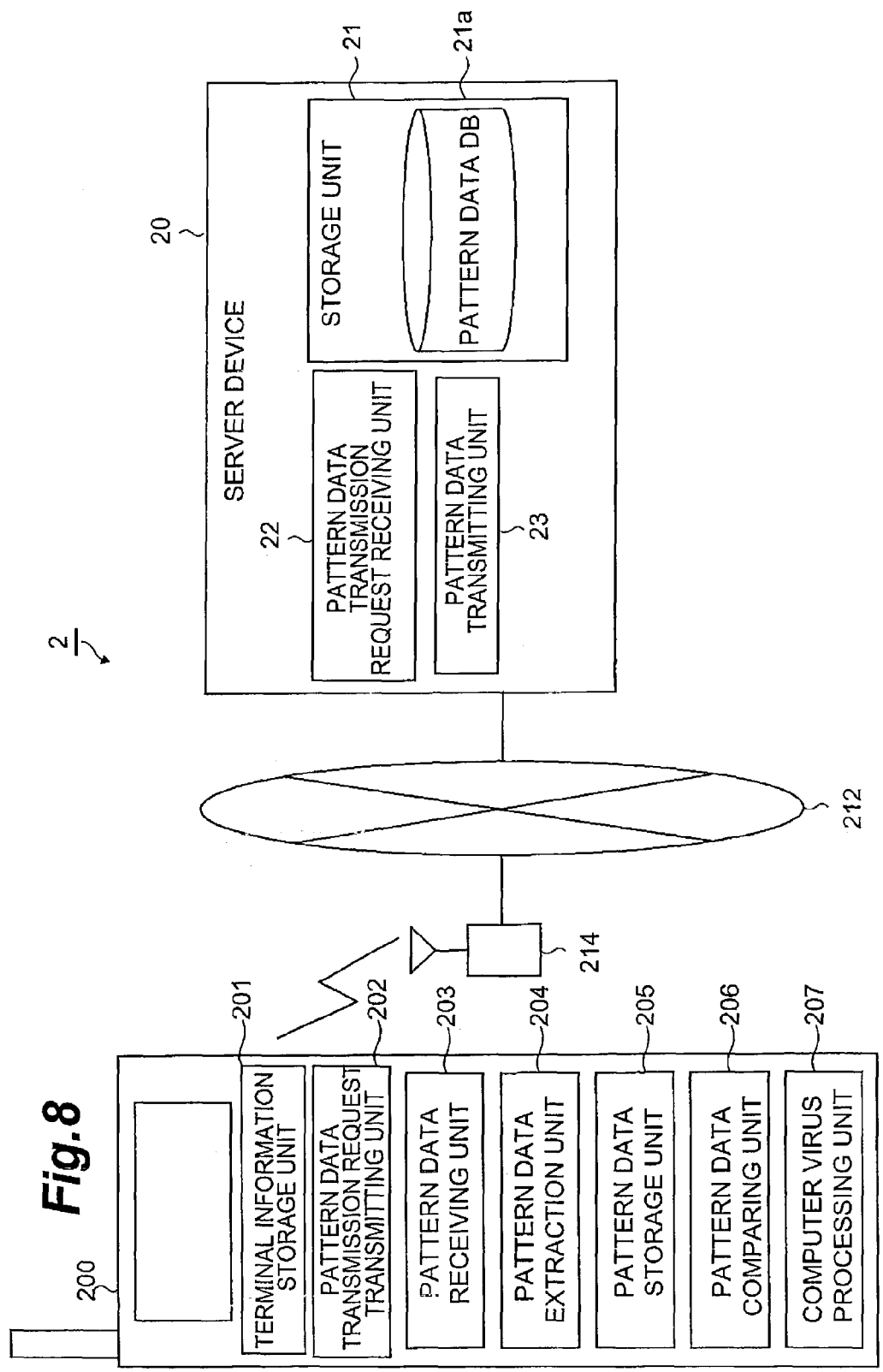
FIG. 8 is a system structural diagram of the information transmitting system of the second embodiment.

FIG. 8 is a system structural diagram of the information transmitting system 2 of the present embodiment. The server device 20 of the information transmitting system 2 is a server device which transmits pattern data used for the detection of computer viruses to a portable telephone 200. In functional terms, this server device 20 comprises a storage unit 21, a pattern data transmission request receiving unit 22, and a pattern data transmitting unit 23. The respective constituent elements will be described in detail below.

A pattern data data base 21*a* is stored in the storage unit 21. FIG. 9 is a structural diagram of the pattern data data base 21*a*. Pattern data, the model names and operating system names (including version information) of the portable telephones that are to receive this pattern data, the degree of danger of computer viruses that have this pattern data, the size of this pattern data and the dates on which this pattern data was updated are stored in association with each other in the pattern data data base 21*a*.

Returning to FIG. 8, the pattern data transmission request receiving unit 22 receives pattern data transmission requests that are transmitted from the portable telephone 200.

The pattern data transmitting unit 23 transmits a list of the pattern data that is stored in the pattern data data base 21*a* to the portable telephone 200. Not only the names of the pattern data, but also the degree of danger of computer viruses that have this pattern data, the size of this pattern data, the dates on which this pattern data was updated and the like are contained in this list of pattern data.

The portable telephone 200 is a mobile communications terminal which receives the pattern data used for the detection of computer viruses that is transmitted from the server device; in functional terms, this portable telephone 200 comprises a terminal information storage unit 201, a pattern data transmission request transmitting unit 202, a pattern data receiving unit 203 (receiving means), a pattern data extraction unit 204 (extraction means), a pattern data storage unit 205 (storing means), a pattern data comparing unit 206 and a computer virus processing unit 207. Here, the terminal information storage unit 201 and pattern data storage unit 205 correspond to the memory 100*b* shown in FIG. 2. The pattern data transmission request transmitting unit 202, pattern data receiving unit 203, pattern data extraction unit 204, pattern data comparing unit 206 and computer virus processing unit 207 are realized as a result of software that is stored in the memory 100*b* shown in FIG. 2 being executed by the CPU 100*a*. The respective constituent elements will be described in detail below.

The terminal information storage unit 201 is constructed from a UIM (or SIM), which is an IC on which user information is recorded. FIG. 10 is a structural diagram of the terminal information storage unit 201. Telephone numbers, model names and operating system names (including version information) of portable telephones 200 are stored in association with each other in the terminal information storage unit 201. Such terminal information may be received from the server device of the mobile communications business operator or the like at the time that a utilization agreement for the portable telephone 200 is concluded, or may be stored beforehand at the time that such a utilization agreement is concluded.

Returning to FIG. 8, the pattern data transmission request transmitting unit 202 transmits pattern data transmission requests to the server device 20.

The pattern data receiving unit 203 receives a list of pattern data that is transmitted from the pattern data transmitting unit 23 of the server device 20.

The pattern data extraction unit 204 extracts specified pattern data from a plurality of sets of pattern data on the basis of the model name and operating system name of the portable telephone 200 stored in the terminal information storage unit 201. To describe this in greater detail, the pattern data extraction unit 204 extracts specified pattern data from the pattern data that is received by the pattern data receiving unit 203 using the model name and operating system name of the portable telephone 200 as a key. The pattern data extraction unit 204 extracts pattern data selected by the user of the portable telephone 200 from this extracted specified pattern data as pattern data that is to be stored by the portable telephone 200.

The pattern data storage unit 205 stores the pattern data that has been extracted by the pattern data extraction unit 204.

The pattern data comparing unit 206 and computer virus processing unit 207 are similar to the pattern data comparing unit 106 and computer virus processing unit 107 described in the first embodiment.

Figure 11:
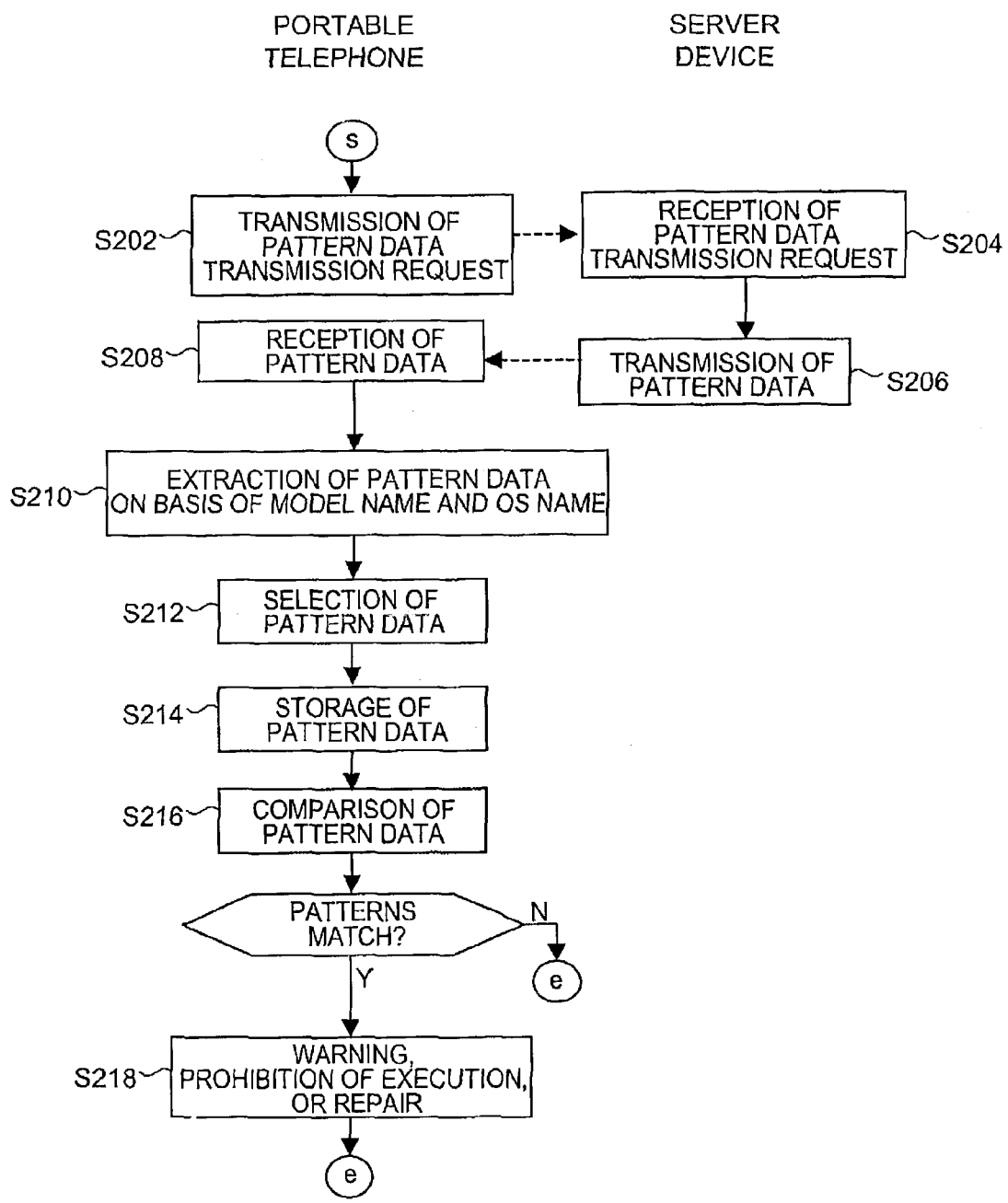
FIG. 11 is a flow chart which shows the flow of the processing of the information transmitting system of the second embodiment.

Next, the operation of the information transmitting system of the present embodiment will be described, and an information receiving method constituting an embodiment of the present invention will also be described. FIG. 11 is a flow chart which shows the operation of the information transmitting system 2 of the present embodiment. In the information transmitting system 2 of the present embodiment, when the portable telephone 200 receives pattern data used for the detection of computer viruses from the server device 20, a pattern data transmission request is first transmitted to the server device 20 from the portable telephone 200 by the pattern data transmission request transmitting unit 202 (S202). The pattern data transmission request that is transmitted from the portable telephone 200 is received by the pattern data transmission request receiving unit 22 of the server device 20 (S204).

When a pattern data transmission request is received by the pattern data transmission request receiving unit 22 of the server device 20, the pattern data stored in the pattern data data base 21a is transmitted to the portable telephone 200 from the pattern data transmitting unit 23 together with various types of information such as the model name, operating system name, degree of danger, size, date of updating and the like (S206). The pattern data and various types of information thus transmitted are received by the pattern data receiving unit 203 of the portable telephone 200 (S208).

Next, specified pattern data is extracted by the pattern data extraction unit 204 from the plurality of sets of pattern data received by the pattern data receiving unit 203 on the basis of the model name and operating system name of the portable telephone 200 (S210). To describe this in greater detail, the model name and operating system name of the portable telephone 200 stored in the terminal information storage unit 201 are acquired. Then, using the model name and operating system name acquired as described above as a key, specified pattern data corresponding to the abovementioned key is extracted from the plurality of sets of data received by the pattern data receiving unit 203. The pattern data extracted here is a candidate for pattern data that is to be stored in the portable telephone 200. For example, in a case where the server device 20 has the pattern data data base 21a shown in FIG. 9, the model name of the portable telephone 200 is "Model 2", and the OS is "OS1, Ver 1.05", "pattern data 2" and "pattern data 4" are extracted.

When specified pattern data is extracted by the pattern data extraction unit 204, a list of the pattern data thus extracted is displayed on the display of the portable telephone 200 as candidates for the pattern data that is to be stored in the portable telephone 200. Not only the names of the pattern data, but also the degree of danger of the computer viruses that have this pattern data received in S208, the size of the pattern data, the dates on which the pattern data was updated and the like, are contained in this list of pattern data.

When the user of the portable telephone 200 selects specified pattern data from this list of pattern data, the selection results are extracted by the pattern data extraction unit 204 (S212). Subsequently, the processing of S214 through S218 is similar to the processing of S112 through S116 that was described with reference to FIG. 5.

Next, the effects and merits of the information transmitting system of the present embodiment will be described. In the information transmitting system 2 of the present embodiment, as in the information transmitting system 1 of the abovementioned first embodiment, when the portable telephone 200 receives pattern data used for the detection of computer viruses from the server device 20, specified pattern data is extracted on the basis of the model name of the portable telephone 200. Accordingly, the quantity of pattern data that is stored in the portable telephone 200 can be efficiently reduced in accordance with the hardware and software of the portable telephone 200. As a result, the detection of computer viruses in the portable telephone 200 can be accomplished in an efficient manner.

Furthermore, in the information transmitting system 2 of the present embodiment, specified pattern data is particularly extracted on the basis of the operating system name of the portable telephone 200. Accordingly, even in cases where the model is the same but the operating system (especially the version of the operating system) that is installed is different, the quantity of pattern data that is stored in the portable telephone 200 can be efficiently reduced in accordance with the operating system of the portable telephone 200.

Furthermore, in the information transmitting system 2 of the present embodiment, pattern data selected by the user of the portable telephone 200 is further extracted from the specified pattern data that is extracted by the pattern data extraction unit 204. Accordingly, the user of the portable telephone 200 can avoid the selection of pattern data that has already been acquired, pattern data for computer viruses that are not thought to have an effect on the portable telephone 200, and the like. As a result, the quantity of pattern data that is stored in the portable telephone 200 can be further reduced. Consequently, the detection of computer viruses in the portable telephone 200 can be accomplished in an efficient manner. Furthermore, in the information transmitting system 2 of the present embodiment, specified pattern data is extracted on the basis of the model name and operating system name of the portable telephone; however, it would also be possible to extract such pattern data on the basis of terminal information such as the names of system control programs (including version information), information regarding the service agreement of the user of the portable telephone, the communications history of the portable telephone, or the like.

Third Embodiment

Next, an information transmitting system constituting a third embodiment of the present invention will be described. Furthermore, the information transmitting system of the present embodiment includes a mobile communications terminal that constitutes an embodiment of the present invention.

First, the construction of the information transmitting system of the present embodiment will be described The hardware construction of the information transmitting system of the present embodiment is similar to the hardware construction of the information transmitting system 1 of the above-mentioned first embodiment that was described with reference to FIGS. 1 and 2.

Figure 12:
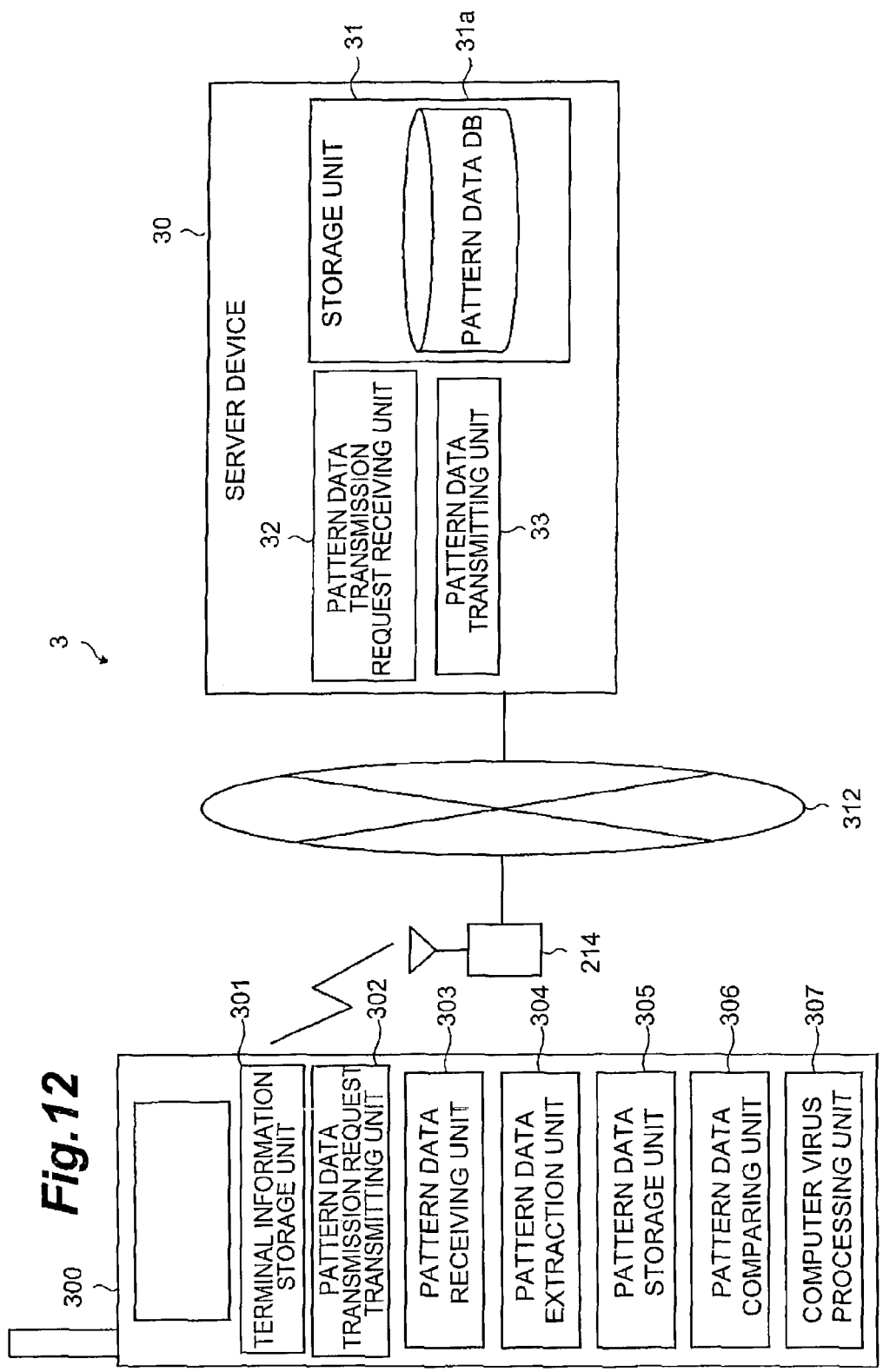
FIG. 12 is a system structural diagram of the information transmitting system of the third embodiment.

FIG. 12 is a system structural diagram of the information transmitting system 3 of the present embodiment. The server device 30 of the information transmitting system 3 is a server device which transmits pattern data used for the detection of computer viruses to a portable telephone 300; in functional terms, this server device comprises a storage unit 31, a pattern data transmission request receiving unit 32 and a pattern data transmitting unit 33. The respective constituent elements will be described in detail below.

A pattern data data base 31*a* is stored in the storage unit 31. FIG. 13 is a structural diagram of the pattern data database 31*a*. Pattern data and the names of application programs that are the object of detection of the presence or absence of computer viruses using this pattern data are stored in association with each other in the pattern data data base 31*a*.

Returning to FIG. 12, the pattern data transmission request receiving unit 32 receives pattern data transmission requests that are transmitted from the portable telephone 300.

The pattern data transmitting unit 33 transmits the pattern data stored in the pattern data data base 31*a* to the portable telephone 300 together with the names of application programs.

The portable telephone 300 is a mobile communications terminal which receives pattern data used for the detection of computer viruses that are transmitted from the server device; in functional terms, this portable telephone 300 comprises a terminal information storage unit 301, a pattern data transmission request transmitting unit 302, a pattern data receiving unit 303 (receiving means), a pattern data extraction unit 304 (extraction means), a pattern data storage unit 305 (storage means), a pattern data comparing unit 306, and a computer virus processing unit 307. Here, the terminal information storage unit 301 and pattern data storage unit 305 correspond to the memory 100*b* shown in FIG. 2. The pattern data transmission request transmitting unit 302, pattern data receiving unit 303, pattern data extraction unit 304, pattern data comparing unit 306 and computer virus processing unit 307 are realized as a result of software that is stored in the memory 100*b* shown in FIG. 2 being executed by the CPU 100*a*. The respective constituent elements will be described in detail below.

As is shown in FIG. 14, telephone numbers and application program names (terminal information) are stored in the terminal information storage unit 301.

Returning to FIG. 12, the pattern data transmission request transmitting unit 302 transmits pattern data transmission requests to the server device 30.

The pattern data receiving unit 303 receives the pattern data that is transmitted from the pattern data transmitting unit 33 of the server device 30 together with application program names.

The pattern data extraction unit 304 extracts specified pattern data from the plurality of sets of pattern data received by the pattern data receiving unit 303 on the basis of the application program names of the portable telephone 300. To describe this in greater detail, the pattern data extraction unit 304 extracts specified pattern data that is to be stored by the portable telephone 300 from the pattern data that is received by the pattern data receiving unit 303 using the names of the application programs stored in the portable telephone 300 as a key.

The pattern data storage unit 305 stores the specified pattern data that is extracted by the pattern data extraction unit 304.

The pattern data comparing unit 306 and computer virus processing unit 307 are similar to the pattern data comparing unit 106 and computer virus processing unit 107 described in the first embodiment.

Figure 15:
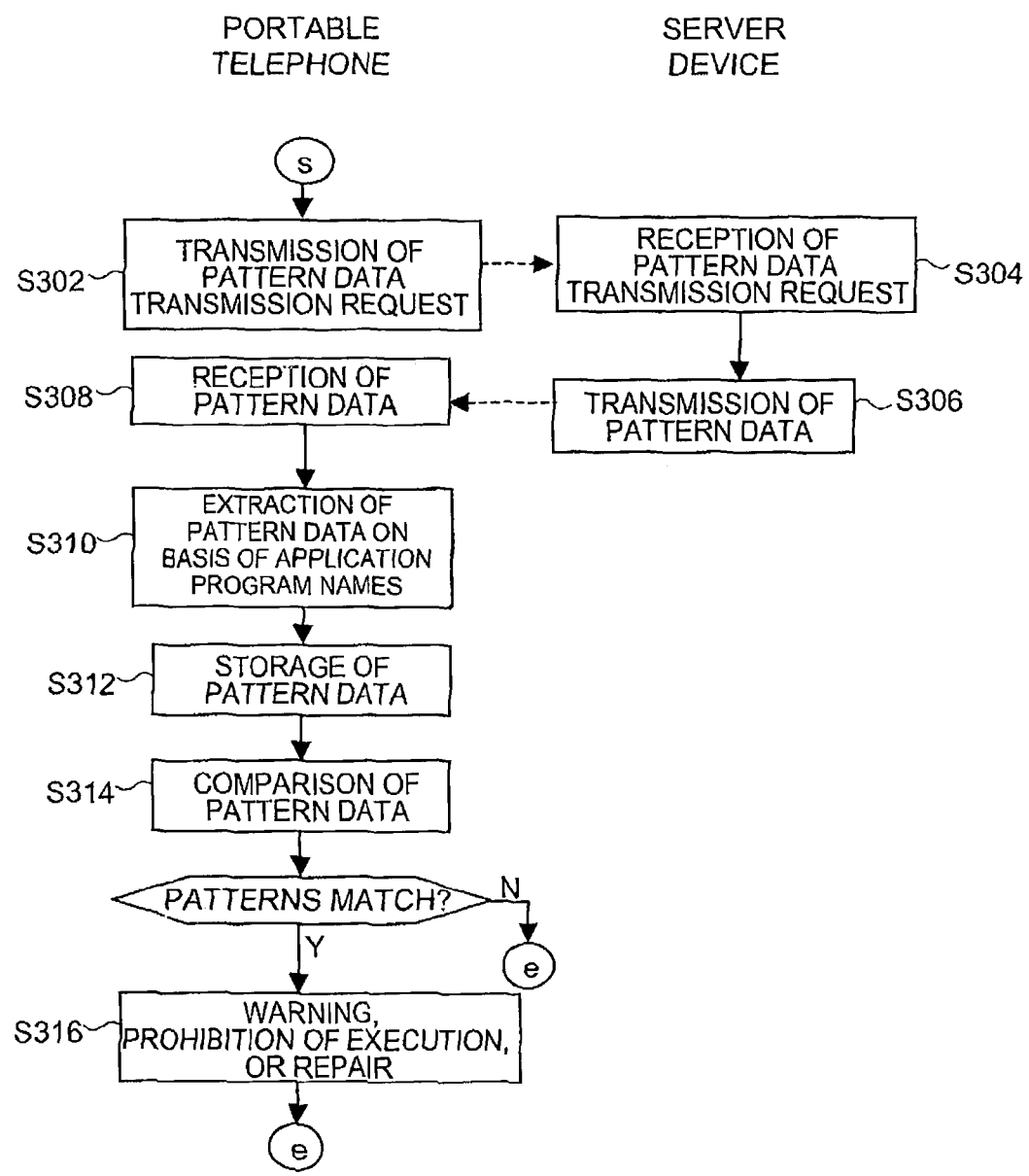
FIG. 15 is a flow chart which shows the flow of the processing of the information transmitting system of the third embodiment.

Next, the operation of the information transmitting system of the present embodiment will be described, and an information receiving method constituting an embodiment of the present invention will be described. FIG. 15 is a flow chart which shows the operation of the information transmitting system 3 of the present embodiment. In the information transmitting system 3 of the present embodiment, when the portable telephone 300 receives pattern data used for the detection of computer viruses from the server device 30, a pattern data transmission request is first transmitted to the server device 30 from the portable telephone 300 by the pattern data transmission request transmitting unit 302 (S302). The pattern data transmission request that is transmitted from the portable telephone 300 is received by the pattern data transmission request receiving unit 32 of the server device 30 (S304).

When a pattern data transmission request is received by the pattern data transmission request receiving unit 32 of the server device 30, the pattern data is transmitted to the portable telephone 300 from the pattern data transmitting unit 33 together with the names of application programs in which the presence or absence of a computer virus can be detected using this pattern data (S306). The transmitted pattern data and application program names are received by the pattern data receiving unit 303 of the portable telephone 300 (S308).

Next, specified pattern data is extracted by the pattern data extraction unit 304 of the portable telephone 300 from the plurality of sets of pattern data received by the pattern data receiving unit 303 on the basis of the names of the application programs stored in the portable telephone 300 (S310). To describe this in greater detail, the names of the application programs stored in the portable telephone 300 are used as a key, and specified pattern data corresponding to the above-mentioned key is extracted from the pattern data received by the pattern data receiving unit 303. For example, in a case where the server device 30 has the pattern data data base 31*a* sown in FIG. 13, and the names of the application programs in the portable telephone 300 are "application program 1" and "application program 2" as shown in FIG. 14, "pattern data 1", "pattern data 3", "pattern data 5" and "pattern data 6" are extracted as the pattern data that is to be stored by the portable telephone 300. Subsequently, the processing of S312 through S316 is similar to the processing of S112 through S116 described with reference to FIG. 5.

Next, the effects and merits of the information transmitting system of the present embodiment will be described. Computer viruses include many computer viruses that depend on the application programs received by the portable telephone 300. Accordingly, specified pattern data is extracted on the basis of the names of the application programs that are present in the portable telephone 300, and the specified pattern data that has thus been extracted is stored in the pattern data storage unit 305 of the portable telephone 300. In this way, the quantity of pattern data that is stored in the portable telephone 300 can be efficiently reduced in accordance with the application programs received by the portable telephone 300. As a result, the detection of computer viruses in the portable telephone 300 can be accomplished in an efficient manner.

Furthermore, in the information transmitting systems of the respective embodiments described above, the transmission of pattern data is performed in response to pattern data transmission requests that are transmitted to the server device from the portable telephone. However, it would also be possible to devise the system so that the server device transmits instructions indicating that the pattern data is to be updated to the portable telephone regardless of the presence or absence of a pattern data transmission request (push type transmission). The portable telephone that receives a push-transmitted instruction for updating transmits a pattern data transmission request to the server device. As a result, the forgetting of updating or omission of updating of the pattern data can be prevented before the fact, so that the reliability of the information transmitting system can be improved.

Furthermore, it is desirable to set conditions for the transmission of a pattern data transmission request by the portable telephone that has received instructions for updating. In regard to such conditions, for example, if a list of model names of the portable telephones that are the object of updating, or a list according to functions (Java applications, web pages or the like) is received by the portable telephone together with the instructions for updating, and a pattern data transmission request is transmitted only in cases that are the object of updating, efficient data updating in which unnecessary pattern data transmission requests are suppressed can be achieved. Alternatively, it would also be possible to devise the system so that a pattern data transmission request is transmitted only in cases where there are instructions for this from the user of the portable telephone.

Furthermore, the constituent elements of the server devices in the information transmitting systems of the respective embodiments described above were physically disposed in a single server device; however, the system may also be devised so that these constituent elements are physically dispersed among a plurality of server devices. For example, in the abovementioned aspect in which updating instructions are push-transmitted, the server device that designates the distribution of updating instructions and the server device that actually push-transmits the updating instructions to the portable telephones may be constructed as separate server devices.

Furthermore, in the information transmitting systems of the respective embodiments described above, the system may also be devised so that in cases where the data stored i the memory of the portable telephone includes portions that match the pattern data stored in the pattern data storage unit, computer virus detection information that includes this pattern data is transmitted to the server device from the portable telephone. This computer virus detection information notifies the server device that the portable telephone is infected with a computer virus. As a result, the server device can quickly ascertain that a computer virus is present in the portable telephone. Furthermore, if the server device transmits computer virus detection information to other portable telephones, a warning regarding computer viruses can also be sent to these other portable telephones.

Furthermore, in the information transmitting systems of the respective embodiments described above, the system may also be devised so that the portable telephone deletes pattern data that has already been utilized (i.e., pattern data for which comparative processing has been completed). By deleting pattern data that has already been utilized, it is possible to achieve effective utilization of the memory of the portable telephone. In regard to the deletion of pattern data, the following aspects may be indicated. For example, the deletion of pattern data may be performed for a portion of the pattern data rather than for all of the pattern data. Furthermore, the deletion of pattern data may be initiated when an effective deadline set beforehand for the pattern data has passed, or may be initiated after a fixed period of time has elapsed following the completion of comparative processing. Furthermore, the deletion of pattern data may also be initiated by instructions from the server device or by instructions from the user of the portable telephone. Moreover, this deletion may be initiated following the detection of computer viruses or following the completion of repair processing.

In the server device, information transmitting system and information receiving method of the present invention, specified data is extracted from a plurality of sets of received data on the basis of terminal information relating to the mobile communications terminal. Accordingly, data that has a high degree of association with the mobile communications terminal can be extracted. In this way, data can easily be stored even in the case of a mobile communications terminal that has an insufficient memory capacity. As a result, the storage of data in the mobile communications terminal can be accomplished in an efficient manner.

What is claimed is:

1. A mobile communications terminal, comprising:
receiving means for receiving a plurality of sets of pattern data that are transmitted from a server device;
extraction means for extracting specified pattern data from said plurality of sets of pattern data received by said receiving means on the basis of terminal information relating to said mobile communications terminal, wherein the specified pattern data extracted by the extraction means defines first pattern data, and the received pattern data that was not extracted by the extracting means defines second pattern data; and
storing means for storing said first pattern data, without storing said second pattern data,
wherein said terminal information relates to the memory capacity of said storing means, said pattern data is used for the detection of computer viruses and is received by said receiving means together with information indicating a degree of danger of said computer viruses and a size of said pattern data, and said extraction means extracts said specified pattern data from said plurality of sets of pattern data in order from the highest degree of danger within a range in which the size of said pattern data does not exceed said memory capacity of said storing means.

2. The mobile communications terminal according to claim 1, wherein said terminal information further relates to the hardware of said mobile communications terminal other than said memory capacity of said storing means.

3. An information transmitting system, comprising:
the mobile communications terminal according to claim 2; and
a server device which transmits said pattern data to said mobile communications terminal.

4. The mobile communications terminal according to claim 1, wherein said terminal information further relates to software of said mobile communications terminal.

5. The mobile communications terminal according to claim 4, wherein said software is an operating system of said mobile communications terminal.

6. An information transmitting system, comprising:
the mobile communications terminal according to claim 5; and
a server device which transmits said pattern data to said mobile communications terminal.

7. The mobile communications terminal according to claim 4, wherein said software is application programs that are stored in said mobile communications terminal.

8. An information transmitting system, comprising:
the mobile communications terminal according to claim 7; and
a server device which transmits said pattern data to said mobile communications terminal.

9. An information transmitting system, comprising:
the mobile communications terminal according to claim 4; and
a server device which transmits said pattern data to said mobile communications terminal.

10. An information transmitting system, comprising.
the mobile communications terminal according to claim 1; and
a server device which transmits said pattern data to said mobile communications terminal.

11. An information receiving method in which a mobile communications terminal receives data from a server device, comprising:
a receiving step in which said mobile communications terminal receives a plurality of sets of pattern data from the server device;
an extraction step in which said mobile communications terminal extracts specified pattern data on the basis of terminal information relating to said mobile communications terminal from said plurality of sets of pattern data received in said receiving step, wherein the specified pattern data extracted by the mobile communications terminal defines first pattern data, and the received pattern data that was not extracted by the mobile communications terminal defines second pattern data; and
a storage step in which said first pattern data is stored in storing means and said second pattern data is not stored,
wherein said terminal information relates to the memory capacity of said storing means, said pattern data is used for the detection of computer viruses and is received in said receiving step together with information indicating a degree of danger of said computer viruses and a size of said pattern data, and said specified pattern data is extracted from said plurality of sets of pattern data, in said extraction step, in order from a highest degree of danger within a range in which the size of said pattern data does not exceed said memory capacity of said storing means.

12. The information receiving method according to claim 11, wherein said terminal information further relates to the hardware of said mobile communications terminal other than said memory capacity of said storing means.

13. The information receiving method according to claim 11, wherein said terminal information further relates to software of said mobile communications terminal.

14. The information receiving method according to claim 13, wherein said software is an operating system of said mobile communications terminal.

15. The information receiving method according to claim 13, wherein said software is application programs stored in said mobile communications terminal.

16. A mobile communications terminal, comprising:
a receiver configured to receive a plurality of sets of pattern data that are transmitted from a server device;
an extractor configured to extract specified pattern data from said plurality of sets of pattern data received by said receiver on the basis of terminal information relating to said mobile communications terminal, wherein the specified pattern data extracted by the extractor defines first pattern data, and the received pattern data that was not extracted by the extractor defines second pattern data; and
a storage device configured to store said first pattern data, without storing said second pattern data,
wherein said terminal information relates to the memory capacity of said storage device, said pattern data is used for the detection of computer viruses and is received by said receiver together with information indicating a degree of danger of said computer viruses and a size of said pattern data, and said extractor extracts said specified pattern data from said plurality of sets of pattern data in order from a highest degree of danger within a range in which the size of said pattern data does not exceed said memory capacity of said storage device.

17. The mobile communications terminal according to claim 16, wherein said terminal information further relates to the hardware of said mobile communications terminal other than said memory capacity of said storage device.

18. The mobile communications terminal according to claim 16, wherein said terminal information further relates to the software of said mobile communications terminal.

19. The mobile communications terminal according to claim 18, wherein said software is an operating system of said mobile communications terminal.

20. The mobile communications terminal according to claim 18, wherein said software is application programs that are stored in said mobile communications terminal.

21. A method of communicating with a mobile communications terminal, comprising:
receiving a plurality of sets of pattern data that are transmitted from a server device;
extracting specified pattern data from said plurality of sets of pattern data received during said step of receiving on the basis of terminal information relating to said mobile communications terminal, wherein the specified pattern data extracted in the extracting step defines first pattern data, and the received pattern data that was not extracted in the extracting step defines second pattern data; and
storing said first pattern data without storing said second pattern data,
wherein said terminal information relates to the memory capacity of said storage device, said pattern data is used for the detection of computer viruses and is received in said step of receiving together with information indicating a degree of danger of said computer viruses and a size of said pattern data, and said specified pattern data is extracted from said plurality of sets of pattern data, in said step of extracting, in order from a highest degree of danger within a range in which the size of said pattern data does not exceed said memory capacity of said storage device.

22. The method of communicating with a mobile communications terminal according to claim 21, wherein said terminal information further relates to the hardware of said mobile communications terminal other than said memory capacity of said storage device.

23. The method of communicating with a mobile communications terminal according to claim 21, wherein said terminal information further relates to the software of said mobile communications terminal.

24. The method of communicating with a mobile communications terminal according to claim 23, wherein said software is operating system of said mobile communications terminal.

25. The method of communicating with a mobile communications terminal according to claim 23, wherein said software is application programs that are stored in said mobile communications terminal.

* * * * *